United States Patent Office 2,976,141
Patented Mar. 21, 1961

2,976,141
PROCESS FOR THE RECOVERY OF VALUES FROM PHOSPHATE ROCK

John N. Carothers and Rudolph J. Hurka, Jr., both of 1629 Lady Marion Lane NE., Atlanta, Ga.

No Drawing. Filed Sept. 9, 1957, Ser. No. 682,605

8 Claims. (Cl. 71—40)

This application is a continuation in part of our application Serial No. 424,931, filed April 22, 1954, now abandoned, and relates to the recovery of values from phosphate rock, particularly from phosphate rock containing fluorine compounds, as well as compounds of other elements, as constituents, by what is generally known as the acidulation process and has for its objects:

(1) The provision of a process wherein the phosphate rock is solubilized with acid in such a manner that a greater percentage of fluorine is solubilized than in processes heretofore in use.

(2) The provision of a process wherein substantially all of the fluorine in the phosphate rock is extracted in recoverable form.

(3) The provision of a process wherein phosphate rock is solubilized with sulfuric acid in the presence of a reactive silica whereby a higher percentage of the fluorine in the rock is solubilized than heretofore thought possible.

(4) The recovery of the phosphate content of phosphate rock as dicalcium phosphate at a lower pH than has heretofore been thought practical.

(5) The provision of a simple, economical process of the character designated whereby dicalcium phosphate may be produced of such purity that it is suitable for animal feed supplement.

(6) The recovery of rare earths.

(7) The defluorination of soluble calcium phosphate containing solutions by means of reagents required solely in dicalcium phosphate production.

(8) The separation and recovery from calcium phosphate solutions of rare earth metals which occur in phosphate rock, or may be added to the phosphate rock before the solubilization step.

Numerous proposals have heretofore been made for solubilizing $P_2O_5$ in phosphate rock, and making dicalcium phosphate, for both fertilizer and food supplement purposes. Some of the processes convert all of the $P_2O_5$ to phosphoric acid, and others solubilize the $P_2O_5$ only to monocalcium phosphate. In addition to the fluorine which is in the phosphate solutions when phosphate rock is solubilized, the iron and aluminum compounds which dissolve when the $P_2O_5$ is solubilized also constitute a major problem in purification to make a dicalcium phosphate acceptable for food supplement purposes.

The difficulty of removing fluorine, iron and aluminum from phosphate solutions is well recognized by those who have experience in this field. Waggaman in "Phosphoric Acid, Phosphates and Phosphatic Fertilizers," 2nd ed., (1952) page 229, has summarized the difficulties in the statement: "These impurities are the most costly to remove from phosphoric acid since when precipitated they carry with them very appreciable quantities of phosphoric acid which is so combined that it cannot be recovered by leaching the precipitate with water or dilute acid."

The elaborate chemical treatments which have been heretofore employed to purify phosphate solutions to make acceptable grades of dicalcium phosphate are illustrated in the patent to Moore No. 2,013,970, in the patent to Seyfried No. 2,164,627, and in the patent to McCullough 2,767,045.

It is accordingly a prime object of our invention to provide for a simpler and more effective process for removing fluorine and aluminum from phosphate solutions than has heretofore been employed, whereby an acceptable quality of dicalcium phosphate may be obtained.

Most commercial types of phosphate rock now produced in the United States contain from 30 to 35% $P_2O_5$; from 3% to 4% of fluorine; from 0.57% to 1.2% $Al_2O_3$; around 0.9% $Fe_2O_3$, and around 5.5% acid insoluble. Besides lesser amounts of sodium and potassium, they also contain very small quantities of elements referred to as "rare earths." By the term "rare earths," we refer to lanthanum, yttrium, and to the members of the series known as "rare earth elements." Although not real members of the "rare earth" series, lanthanum and yttrium are commonly grouped with the members of the rare earth series on the basis of similarity of properties.

Most commercial types of phosphate rock are generally referred to as fluorapatite. The fluorine content of the rock however is greater than that represented by the empirical formula, $3Ca_3(PO_4)_2 \cdot CaF_2$, in general use in referring to the phosphate and fluorine components of phosphate rock; that is, for every 426 parts by weight of $P_2O_5$ there should be 38 parts by weight of fluorine. Waggaman, ante, page 36. Datin, et al., in an article appearing in Industrial and Engineering Chemistry, vol. 44, pages 903, 904, give the composition of a typical Florida phosphate rock as 34.3% $P_2O_5$ and 3.70% F. Since a phosphate rock containing 3.1% fluorine should contain 34.8% $P_2O_5$ to contain the amount of phosphorus theoretically required for fluorapatite, and a phosphate rock containing 3.7% F would have to contain 41.5% $P_2O_5$ in order that there not be an excess of fluorine over that theoretically required for fluorapatite, it should be noted that in most phosphate rock, the ratio of fluorine to $P_2O_5$ is in excess of that in the indicated composition of fluorapatite.

In the course of our investigations we have solubilized phosphate rock from Florida, from Tennessee, from the western States and from North Africa. The $P_2O_5$ content of the phosphate rock and the ratio of fluorine to $P_2O_5$ in the rock from these different sources was substantially the same. In the tests, comparable solubilizing procedures and acidulation ratios were used. However, we observed that when sulfuric acid alone was the acidulating acid, different quantities of fluorine and aluminum were solubilized. In the past, it has been the general belief that solubilization of the phosphate component by means of acid attack results in the simultaneous solubilization of the fluorine component. The opinion has also been generally held that since phosphate rock contains silica and silicates, and since the total quantity of silica and silicates present is more than sufficient to react with the fluorine content of the rock, on acid solubilization of the phosphate rock there is ample silica to react with the fluorine solubilized to form fluosilicates. However, we have found in our solubilization of phosphate rocks with sulfuric acid alone, that under certain conditions substantially all of the phosphate component may be dissolved with the simultaneous solubilization of as little as 15% to 20% of the fluorine, and in the case of high grade Florida land pebble of only 50% to 70% of the fluorine. In other words, the solubilization is not that of a fluorapatite exclusively.

Furthermore, we have discovered that in spite of the apparently sufficient quantity of silica present in the phosphate rock, the addition of silica in a form known to be reactive results in the solubilization of substantially all of the fluorine during acid solubilization of phosphate rock under the same conditions in which only 50% to 70% of the fluorine was solubilized in the absence of the added reactive silica. We have also observed that with reactive silica present, there was an increase in the solubilization of the aluminum content of the rock. Thus, when the acid solubilization of phosphate rock is carried out in the presence of reactive silica, in the proportion of 2 to 8 parts $SiO_2$ to 400 parts phosphate rock, the aluminum and fluorine components of the rock are solubilized to a far greater extent than occurs when an equivalent amount of phosphate rock is solubilized with an equivalent amount of sulfuric acid alone.

Instead of adding reactive silica as a means of increasing the quantity of fluorine solubilized during the acid attack of phosphate rock with sulfuric acid, we have found that reactive silica or silicate is apparently formed in situ and a similar result may be obtained by heating high grade Florida phosphate rock to a temperature in the neighborhood between 750° C. and 850° C. prior to solubilization.

Illustrative of this behavior is the following: using a phosphate rock in which the fluorine to $P_2O_5$ ratio is approximately 1 to 9, acid solubilization with sulfuric acid alone resulted in a solution in which the fluorine to $P_2O_5$ ratio was approximately 1 to 16, when approximately 90% of the $P_2O_5$ was brought into solution; whereas under the same acidulation conditions with the exception of the addition of a reactive form of silica, the fluorine to $P_2O_5$ ratio in the solution was approximately 1 to 9 with the solubilization of approximately 95% of the $P_2O_5$. A similar solubilization using the above mentioned rock after calcining at 750° to 850° C., thus apparently forming reactive silica or silicate in situ, resulted in a fluorine to $P_2O_5$ ratio in the solution of approximately 1 to 10, the $P_2O_5$ in the rock being approximately 96% solubilized. The comparisons are tabulated below:

|  | Percent $P_2O_5$ | Percent Al | Percent F |
| --- | --- | --- | --- |
| High grade Florida phosphate rock; $H_2SO_4$ alone | 14.45 | 0.068 | 0.88 |
| High grade Florida phosphate rock $H_2SO_4$ plus reactive silica | 14.14 | 0.176 | 1.67 |
| High grade Florida phosphate rock, calcined at 750° to 850° C., $H_2SO_4$, only | 15.30 | 0.18 | 1.60 |

We have also discovered that the constituents occurring in phosphate rock in very small quantities, heretofore referred to as rare earth elements, may be caused to react in phosphate solutions, as hereafter described, to participate in the formation of substantially insoluble fluorine compounds, the existence of which has not been heretofore described.

Briefly, our process comprises solubilizing the $P_2O_5$ contained in the phosphate rock with sulfuric acid in an amount sufficient to convert about 80% of the $P_2O_5$ to phosphoric acid as described elsewhere in this specification with or without the presence of reactive silica, together with sufficient water to produce a filterable reaction mass with the precipitation of calcium sulfate. The water may be supplied by the filtrate from a preceding batch. The calcium sulfate and other insoluble matter is separated from the solution and is discarded. A solution such as we thus obtain contains from 7% to upwards of 15% $P_2O_5$, up to 0.2% Al, and from 0.2% to upwards of 1.7% F.

The effect of the time on extent of solubilization is given in the following tabulation:

Reaction time: Percent $P_2O_5$ Solubilized
4 hours ------------------------------------- 94
24 hours ------------------------------------ 95
48 hours ------------------------------------ 96

The solution thus formed will have a pH of from 0.9 to 1.3.

When the phosphate solution, whether made with Florida phosphate rock and sulfuric acid alone, or with a reactive form of silica added, or from Florida phosphate rock which has been heated to temperatures in the neighborhood of 750° to 850° C. prior to solubilization with sulfuric acid, is allowed to stand for a period of time after separation from the calcium sulfate and insoluble matter, insoluble octahedral crystals will form which contain substantial amounts of fluorine, calcium, aluminum and sulfate. Besides containing fluorine, calcium, aluminum and sulfate, we have found by spectroscopic examination of these crystals that they contain Sr, Na, Si, La, and Y. They also contain water of crystallization or constitution.

The approximate composition of these crystals is as follows:

| | Percent |
| --- | --- |
| Ca | 19–20 |
| Al | 4–5 |
| F | 29.5–30.5 |
| $P_2O_5$ | 1.2–2.8 |
| $SO_4$ | 10–11.5 |

Remainder, Sr, Si, rare earths, water and others.

It will be noted that these crystals have neither the percentage of Ca or F that is found in $CaSiF_6$, or $CaF_2$, nor the Ca to F ratio of these compounds. There is a small quantity of $P_2O_5$ in the crystals, ranging from 1.2% to 2.8% $P_2O_5$. Whether this phosphate is replacing sulfate in the crystal, or whether it is occluded has not been determined.

When these crystals have formed, the subsequent recovery of the phosphate content of the solution as dicalcium phosphate is readily accomplished without any serious effects caused by side reactions which involve fluorine when substantial quantities of aluminum are present. The fact that aluminum and fluorine form complexes in acid solution is well known. When the removal of aluminum from the phosphate solutions by means of this crystallization is accomplished as herein described so that the aluminum content of the solution is low, the subsequent removal of the remaining fluorine is relatively simple.

In the removal of fluorine and aluminum in octahedral crystals of fluometallic compounds, certain requirements of the phosphate solution characteristics must be met. There should be at least two and one-half parts sulfate to one part aluminum in the solution to furnish that required by the crystals, which contain approximately 10–11.5% $SO_4^{--}$. In the case of solutions relatively high in fluorine and aluminum content, the addition of sulfate, for instance as calcium sulfate, will be necessary.

For example, a phosphate solution formed according to our preferred procedure when phosphate rock was solubilized with sulfuric acid with reactive silica present, contained approximately 14.6% $P_2O_5$, 1.8% Ca, 0.18% Al, and 1.6% F. The fluorine content, and the aluminum content represented approximately 90% of the fluorine and aluminum initially present in the phosphate rock. After the octahedral crystals started to form, sulfate, as sulfuric acid, was added to the solution on the basis of four parts sulfate to one part of aluminum to provide an excess of sulfate required. Octahedral crystals continued to form until the fluorine content was lowered to 0.27% and the aluminum content to 0.005%.

If calcium sulfate, say as gypsum, is added to such solutions, it will be seen that the gypsum disappears as a solid phase in contact with the solution as the quantity of octahedral crystals increases. Similarly, if crystalline calcium fluoride is added to a solution in which the aluminum content is relatively high, and if the sulfate requirement mentioned above is provided, the calcium fluoride will be seen to disappear as a solid phase in contact with the solution as the quantity of octahedral crystals increases.

Rare earth containing materials such as monazite may be solubilized and added to the reacting mixture or to the solution after solubilization or they may be added during the solubilization. If the solubilization of the rock is made with reactive silica present, or if previously heated rock is used in the solubilization, the fluorine and rare earth compounds will remain in solution for a longer time before the octahedral crystals begin to form than if reactive silica is not added in the solubilization.

When monazite was added, cerium and ytterbium were found in the fluorine compound precipitate. As to the precise function of strontium, we can only say that there seems to have been adequate quantities in all of the rock which we have tested.

The fluorine, aluminum and rare earth elements may also be further removed from the solution in a lesser period of time by heating the solution to a temperature of from 85° C. to the boiling point and adding calcium carbonate, limestone or lime to the solution as hereinafter described. The precipitated solids are separated from the solution and a further amount of calcium carbonate, limestone or lime is added to form substantially fluorine free dicalcium phosphate.

In accordance with our invention four hundred parts of comminuted phosphate rock (34% $P_2O_5$ grade) may be reacted with an equivalent of 280 parts by weight of sulfuric acid (100% basis) and 730 parts by weight of water which may be provided by the filtrate from a previous batch. Sulfuric acid of approximately 14% to approximately 62% $H_2SO_4$ may be employed, although we prefer to use in the neighborhood of 28%. The amount of water used should be that required to provide a solution having a $P_2O_5$ content of from 7% to upwards of 16% and may be varied, as is well understood by those skilled in the art. If the recovery of substantial quantities of fluorine is desired, the equivalent of from 2 to 8 parts of $SiO_2$ in a reactive form should be added to the solubilizing mixture. As an alternative, the phosphate rock may be calcined at a temperature in the neighborhood of 750° C. to 850° C. prior to solubilization.

The acid thus employed is on the basis of approximately 2.06 parts $H_2SO_4$ to each part $P_2O_5$ in the rock or 80% of that required to form phosphoric acid, as stated in Waggaman, page 216. "In treating high grade rock by the wet process to recover a ton of phosphorus pentoxide in the form of crude phosphoric acid, 2.57 tons of sulfuric acid (basis 100 percent $H_2SO_4$) are required."

We have found that by using the ratio of 2.06 parts of acid to 1 part $P_2O_5$ in the rock, the solution obtained may be purified more satisfactorily, i.e., the fluorine and aluminum can be removed more successfully as octahedral crystals, or by the partial neutralization step as previously described, than is the case when the $P_2O_5$ is solubilized to phosphoric acid.

After separation of solids from the solution, as by filtering, the filtrate, comprising a solution of monocalcium phosphate, phosphoric acid and fluorine containing compounds is then handled as follows:

(1) It may be allowed to stand at ambient temperature for the formation of the octahedral crystals heretofore described and thereby remove a substantial portion of the impurities fluorine and aluminum from the solution in an easily recoverable form. If this procedure is followed it is necessary to provide sufficient sulfate to supply the needs in the formation of the octahedral crystals, as previously set forth;

Or, when it is not desired to remove the fluorine by means of the procedure of forming octahedral crystals, but instead to recover the fluorine in a less pure form;

(2) The filtrate from the calcium sulfate separation may be heated to a temperature of from 85° C. to the boiling point and calcium carbonate, lime or limestone be added to provide a $P_2O_5$ to Ca weight ratio between 10 to 1 and 4 to 1. The heating is continued for an hour or more until the precipitation of the fluo-metallic compounds is completed. The final pH of the solution will be between 1.1 and 1.7. As an alternate procedure in this method of fluorine removal, the addition of the basic calcium compound may be made at ambient temperature before the solution is heated with equally satisfactory results. As much as 5% to 6% of the $P_2O_5$ in the solution may be precipitated with the fluo-metallic compounds.

(3) The solution of (1) above, after separation from the fluorine containing octahedral crystals, may then be treated as in (2) above, to effect the removal of any remaining quantities of fluorine.

The addition of the basic calcium compound as described in (2), above, results, of course, in the partial neutralization of the acidity of the solution, although the pH increase is not great.

When the partially neutralized solution is heated for a sufficient length of time to precipitate substantially all of the fluorine in the form of insoluble compounds and the precipitate is separated from the phosphate solution, then on further neutralization with calcium carbonate, lime or limestone a substantially fluorine free dicalcium phosphate will be formed. Such dicalcium phosphate is sufficiently low in fluorine to permit its use as an animal feed supplement, since the phosphorus to fluorine ratio will be in excess of 100 to 1.

We have solubilized phosphate rock under conditions where the maximum temperature was in the neighborhood of 90°–100° C. and also where the temperature was in the neighborhood of 40° C. with satisfactory results. When the temperature of the solubilization was in the neighborhood of 40° C., however, we obtained somewhat better defluorination. The examples given herein will show in detail the quantities of materials used and the procedure followed in carrying out our process.

*Example 1*

A typical procedure employing sulfuric acid alone follows:

407 parts phosphate rock containing 33.42% $P_2O_5$, and 3.80% F are moistened with 150 parts water, then 860 parts of 32.6% sulfuric acid are added with stirring. After reacting four hours the solids are separated from the solution by filtration. A typical analysis of such a solution would be as follows:

|  | Percent |  | Percent |
|---|---|---|---|
| $P_2O_5$ | 14.3 | $SO_4$ | 0.285 |
| F | 0.88 | Fe | 0.208 |
| Ca | 0.90 | Al | 0.043 |

Analysis of the dried filter cake indicates that 94.6% of the $P_2O_5$ had been solubilized, with 91.6% of the $P_2O_5$ in water soluble form. 49.5% of the fluorine initially present was solubilized. When the solution was examined 12 hours after separation from the sulfate cake, octahedral crystals were forming.

After such a solution stands at ambient temperature for from 3 to 10 days fluo-metallic compounds in the form of octahedral crystal form and precipitate a substantial portion of the fluorine and aluminum at which time the fluorine and aluminum containing solids may be separated from the phosphate solution by any suitable means such as filtration. Such fluorine and aluminum as remains in the solution is then conveniently removed by adding calcium carbonate, limestone or lime in an amount equivalent to 2.46 to 3.36 parts by weight of CaO to 20 parts $P_2O_5$ in the solution thereby establishing a weight ratio of $P_2O_5$ to calcium of between 10 to 1 and 4 to 1. This may be done conveniently by adding 4.4 to 6.0 parts limestone per 20 parts $P_2O_5$ in the solution. The solution is then heated to between 85° C. and its boiling point for at least one hour to further precipitate fluometallic compounds. The solution is then separated from the fluometallic compounds by any convenient means such as filtration and a further amount of calcium carbonate, limestone or lime is added to the solution until a pH between 3.5 and 4.5 is reached, at which time over 90% of the $P_2O_5$ in the solution is precipitated as substantially fluorine free DCP. At this time the weight ratio of $P_2O_5$ to calcium in the system will be approximately 1.77 to 1. After separating the precipitated dicalcium phosphate from the solution and washing with water the solution and washings are returned to a succeeding batch. The dicalcium phosphate is dried. The phosphorus to fluorine ratio in the dicalcium phosphate will be in excess of 100 to 1.

By returning the filtrate to a succeeding batch we are enabled to recover the remaining $P_2O_5$ in the solution, and to dilute the sulfuric acid employed to solubilize the succeeding batch of phosphate rock.

Example 2

In this example, high grade Florida phosphate rock was solubilized with sulfuric acid in the presence of reactive silica, using an acidulation ratio of $H_2SO_4$ to $P_2O_5$ of 2.06.

407 parts phosphate rock containing 33.42% $P_2O_5$, and 3.80% F were thoroughly mixed with 9.8 parts silicic acid (80% $SiO_2$), moistened with 150 parts water, then 860 parts of 32.6% sulfuric acid were added with stirring. The maximum temperature of the mix was 72° C. After reacting four hours the solids were separated from the solution by filtration. The solution analyzed:

| | Percent | | Percent |
|---|---|---|---|
| $P_2O_5$ | 14.45 | $SO_4$ | 0.169 |
| F | 1.60 | Fe | 0.231 |
| Ca | 1.40 | Al | 0.172 |

Analysis of the dried filter cake indicated that 94.9% of the $P_2O_5$ had been solubilized, with 91.2% of the $P_2O_5$ in water soluble form. 88.5% of the fluorine initially present was solubilized.

With such a solution it would be necessary to add $SO_4^{--}$ as calcium sulfate or sulfuric acid in the amount of approximately 0.33 parts $SO_4^{--}$ per 100 parts solution so that, together with the sulfate already present in the solution, there would be two and one half parts sulfate to one part aluminum precipitated along with the fluorine content of the solution as octahedral crystals.

After separation of the octahedral crystals which form and precipitate out of the solution, the solution may be treated further as set forth in Example 1 to recover more fluorine and dicalcium phosphate.

Example 3

High grade comminuted Florida phosphate rock was calcined at a temperature between 750° and 850° C., and then cooled. It was then solubilized using an acidulation ratio of $H_2SO_4$ to $P_2O_5$ of 2.06: this example illustrates the solubilizing effect on the aluminum and fluorine in the rock by calcining the phosphate rock prior to solubilization thereby apparently forming reactive silica in situ. On being heated to a temperature between 750° and 850° C., the phosphate rock from the same lot used in Examples 1 and 2, above, exhibited a weight loss so that 384.8 parts of the heated rock had the $P_2O_5$ and F content of 407 parts of the raw rock.

384.8 parts calcined phosphate rock containing 35.4% $P_2O_5$ and 4.0% F were moistened with 150 parts water, then 860 parts 32.6% sulfuric acid were added with stirring. The maximum temperature of the mix was 87° C. After reacting 48 hours the solids were separated from the solution by filtration. The solution analyzed:

| | Percent | | Percent |
|---|---|---|---|
| $P_2O_5$ | 15.25 | $SO_4$ | 0.135 |
| F | 1.62 | Fe | 0.218 |
| Ca | 1.62 | Al | 0.185 |

To such a solution, it would be necessary to add $SO_4^{--}$ as, for instance, calcium sulfate or sulfuric acid, in the amount of approximately 0.40 parts $SO_4$ per 100 parts of solution so that, together with the sulfate already present in the solution, there would be two and one half parts sulfate ions to one part aluminum in order to precipitate the aluminum along with the fluorine present, as octahedral crystals.

In a similar test, it was found that 95.8% of the $P_2O_5$ had been solubilized, with 93.3% of the $P_2O_5$ in water soluble form. 87.3% of the fluorine initially present was solubilized.

While we have described several ways in which our improved process may be successfully carried out it will be obvious to those skilled in the art that it is not so limited but that it is susceptible of various changes and modifications without departing from the spirit thereof, and we desire therefore that only such limitations shall be placed thereupon as are set forth in the appended claims.

What we claim is:

1. In a process of recovering values from high grade Florida phosphate rock, reacting the phosphate rock with sulfuric acid as the only acid limited to an amount approximately 80% of that required to convert the $P_2O_5$ content of the rock to phosphoric acid and in the presence of sufficient water to form a filterable solution, separating the resulting solids from the solution, said solution containing from 7% to 16% $P_2O_5$, from 0.2% to 1.7% fluorine, from 0.043 to 0.2% aluminum together with sulfate, calcium, and rare earths, the sulfate being in an amount whereby the $SO_4^{--}/Al$ weight ratio in the solution is at least two and one half parts sulfate to one part aluminum, thereby to precipitate fluometallic compounds in the form of octahedral crystals containing aluminum, fluorine, calcium and sulfate, and separating the crystals from the solution.

2. In a process of recovering values from high grade Florida phosphate rock, reacting the phosphate rock with sulfuric acid as the only acid in an amount approximately 80% of that required to convert the $P_2O_5$ content of the rock to phosphoric acid and in the presence of reactive silica in the proportion of 2 to 8 parts $SiO_2$ to 400 parts phosphate rock together with sufficient water to form a filterable solution containing from 7% to 16% $P_2O_5$, from 0.7% to 1.7% fluorine, from .043% to 0.2% aluminum, together with sulfate, calcium, and rare earths, separating the resulting solids from the solution, adjusting said solution with a sulfate selected from the group consisting of sulfuric acid and calcium sulfate in an amount to provide a ratio of $SO_4^{--}/Al$ of at least two and one half parts $SO_4^{--}$ to one part aluminum, thereby to precipitate fluometallic compounds in the form of octahedral crystals containing aluminum, fluorine, calcium and sulfate, separating the crystals from the solution, and recovering phosphate values from the solution.

3. A process of recovering values from high grade Florida phosphate rock which comprises reacting the comminuted phosphate rock with sulfuric acid as the only acid in an amount approximately 80% of that required to convert the $P_2O_5$ content of the rock to phosphoric acid and with sufficient water to form a filterable solution containing from 7% to 16% $P_2O_5$, from 0.2% to 1.7% fluorine, from .043% to 0.2% aluminum together with sulfate, calcium, and rare earths, separating the resulting solids from the solution, adjusting said solution with a sulfate selected from the group consisting of sulfuric acid and calcium sulfate, in an amount to provide two and one half parts by weight of $SO_4^{--}$ for each part by weight of aluminum in the solution whereby the aluminum, fluorine and calcium in the solution combine with other elements therein to form and precipitate fluometallic compounds in the form of octahedral crystals, and separating the solids from the solution.

4. A process as defined in claim 3 in which reactive silica in the form of silicic acid is added to the reacting mixture of phosphate rock and sulfuric acid in the proportion of at least one part by weight $SiO_2$ to 400 parts by weight of phosphate rock.

5. A process as defined in claim 3 in which the phosphate rock is calcined at a temperature in the neighborhood of 750° C. to 850° C. prior to reacting with sulfuric acid.

6. In a process of recovering values from high grade Florida phosphate rock containing a minor proportion of compounds of fluorine, aluminum and rare earths, acidulating the phosphate rock in the presence of reactive silica in the proportion of 2 to 8 parts $SiO_2$ to 400 parts phosphate rock with sulfuric acid as the only acid in an amount limited to that necessary to convert the $P_2O_5$ content of the rock to water soluble phosphate and with sufficient water to form a filterable solution containing the major portion of the fluorine and aluminum in solution, separating the resulting solids from the solution, adjusting the solution with a sulfate selected from the group consisting of sulfuric acid and calcium sulfate sufficient to provide at least two and one half parts by weight $SO_4^{--}$ to one part by weight of aluminum in the solution, whereby the aluminum, fluorine, sulfate, calcium, and rare earths in the solution combine to form fluometallic compounds in the form of octahedral crystals, separating the crystals from the solution, and recovering phosphate values from the solution.

7. A process as defined in claim 6 in which rare earth containing materials are added to the reacting mixture.

8. In a process for the recovery of fluorine values from high grade Florida phosphate rock by reacting said phosphate rock with sulfuric acid in an amount limited to that necessary to convert substantially all of the $P_2O_5$ content of the rock to water soluble phosphates, the improvement which consists in adding during the reaction, reactive silica in the proportion of at least 2 parts of reactive silca to 400 parts of the rock, in the presence of sufficient water to form a filterable solution containing substantially all the fluorine present in the rock.

References Cited in the file of this patent

UNITED STATES PATENTS

| | | |
|---|---|---|
| 301,248 | Liebig et al. | July 1, 1884 |
| 418,259 | Winssinger | Dec. 31, 1889 |
| 2,271,712 | Peirce | Feb. 3, 1942 |
| 2,759,795 | Archer | Aug. 21, 1956 |
| 2,767,045 | McCullough | Oct. 16, 1956 |
| 2,769,686 | McCullough et al. | Nov. 6, 1956 |
| 2,783,140 | Hignett et al. | Feb. 26, 1957 |